United States Patent [19]

Kim et al.

[11] 4,261,959

[45] Apr. 14, 1981

[54] PROCESS FOR EXTRACTING FERRIC IRON FROM AN AQUEOUS SOLUTION

[75] Inventors: Tai K. Kim; Martin B. MacInnis, both of Towanda, Pa.

[73] Assignee: GTE Products Corporation, Stamford, Conn.

[21] Appl. No.: 105,003

[22] Filed: Dec. 18, 1979

[51] Int. Cl.$^3$ ............................................. C01G 49/10
[52] U.S. Cl. .................................................. 423/139
[58] Field of Search ................................ 423/139, 493

[56] References Cited

U.S. PATENT DOCUMENTS

| | | | |
|---|---|---|---|
| 3,622,269 | 11/1971 | Yamamura | 423/139 |
| 3,725,527 | 4/1973 | Yamamura | 423/139 |
| 3,795,727 | 3/1974 | Yamamura | 423/139 |

OTHER PUBLICATIONS

Marcus et al., *Ion Exchange and Solvent Extraction of Metal Complexes*, Wiley-Interscience (1969), pp. 634–645, 950, 951.

*Primary Examiner*—Brian E. Hearn
*Attorney, Agent, or Firm*—Robert E. Walter

[57] ABSTRACT

Ferric iron is removed from an aqueous chloride solution containing other cations by extracting ferric iron with a liquid organic extractant comprising a ketone having less than about eight carbon atoms for a sufficient period of time to extract ferric iron into the organic liquid extractant. The organic liquid extractant is separated from the aqueous chloride solution containing other cations and the ferric iron is stripped from the organic liquid.

1 Claim, No Drawings

PROCESS FOR EXTRACTING FERRIC IRON FROM AN AQUEOUS SOLUTION

The present invention relates to a process for removing ferric iron from an aqueous chloride solution containing other cations by solvent extraction.

U.S. Pat. No. 4,016,054 to Gandon et al relates to a hydrometallurgical process for extracting metal values from ferro-nickel obtained by the reductive fusion of oxidized nickel-bearing minerals rich in silica and magnesia. The ferro-nickel starting material is treated with chlorine in an aqueous medium and filtered. The filtrate is oxidized and iron is removed therefrom by liquid extraction. Subsequent separate liquid extraction steps are utilized for removing cobalt and chromium so as to yield a final solution of filtrate comprising nickel chloride.

U.S. Pat. Nos. 3,446,720 to Brooks and 3,005,754 and 3,374,090 to Fletcher relate to solvent extraction processes for separating iron from cobalt and nickel using a high molecular weight secondary amine and naphthenic acid dissolved in kerosene extraction systems. U.S. Pat. Nos. 3,438,768 to Ashbrook and 3,399,055 to Ritcey et al relates to solvent extraction processes for separating cobalt from nickel using organo phoshoric acid compounds such as di-2-ethyl hexyl phosphoric acid dissolved in kerosene or naphtha.

U.S. Pat. No. 3,069,231 to Hard et al relates to a solvent extraction process for separating cobalt from nickel sulfate solutions using methyl isobutyl ketone as a solvent for thiocyamic acid extractant. Aqueous solutions containing iron and other cations such as aluminum, cobalt, chromium, copper, magnesium, manganese, and various other soluble cations may be obtained from a variety of processes. It is desirable to separate the various constituents so that they may be reused to recover valuable components and reduce environmental contamination which may be caused by disposal thereof.

According to one industrial process, ferric chloride is used as the etching solution in the manufacture of lead frames. Metal alloys such as Kovar containing about 29 percent nickel, 17 percent cobalt and 54 percent iron are etched by the solution to form a circuit patern. The resulting solution becomes contaminated with iron, nickel and cobalt. As the contamination increases, the etching rate of ferric chloride solution decreases. It is desirable to separate and recover the various components from the spent ferric etch solution and convert them into economically usable products.

Heretofore, many of the prior art processes are not effective for extracting iron from solutions containing a relatively high concentration of hydrochloric acid.

SUMMARY OF THE INVENTION

It is an object of the present invention to provide an improved process for the extraction recovery of iron from an aqueous solution containing other cations.

It is a further object of this invention to provide a process wherein soluble iron may be removed from a relatively strong acid solution.

It is a further object of this invention to provide a process wherein the extracted iron can be stripped for use in recycling.

Other and further objects of the invention will become apparent from reading the following description.

In accordance with the principles of the present invention, there is provided a process for removing ferric iron from an aqueous chloride solution containing other cations comprising contacting the aqueous chloride solution with a suitable amount of liquid organic extractant comprising a ketone having less than about eight carbon atoms for a sufficient period of time to extract ferric iron into said organic liquid extractant, separating the organic liquid extractant containing the ferric iron from the aqueous chloride solution containing other cations, and stripping the ferric iron from the organic liquid extractant to recover an aqueous ferric chloride solution.

DETAILED DESCRIPTION

The starting aqueous chloride solution from which it is desirable to separate soluble iron may include minor amounts of cations such as aluminum, arsenic, barium, berylium, calcium, cadmium, chromium, cobalt, magnesium, manganese, molybdenum, nickel, lead, tin, and titanium and other metallic cations. Such cations may be referred to hereinafter as impurities even though they are valuable constituents which recovery of is often desirable. As hereinbefore mentioned, such solutions may be the product of various hydrometallurgical processes, by-products or waste streams from various industrial processes. Typically, the starting chloride solution is acidic and has a ferric iron concentration greater than about 10 grams per liter and preferably more than about 50 grams per liter. The pH of the starting solution is preferably less than about 2 with pH values less than about 1 being preferable. Preferably the primary contributor to the acidity is hydrochloric acid.

Since the extractable species is present in the form of ferric iron, it is desirable to oxidize any ferrous iron present in the starting solution to ferric iron to increase the amount of extractable iron. Typical oxidation processes involve contacting the starting solution with an oxidizing agent such as sodium hypochlorite or hydrogen peroxide. Preferably, the oxidation of soluble iron from the divalent state to the trivalent state is performed by contacting chlorine gas with the solution for a sufficient period of time to substantially oxidize all of the ferrous iron to the ferric iron.

To obtain high efficiency extraction, it is desirable to have hydrochloric acid present to such an extent so as to result in the formation of the extractable species during the extraction step. The extractable species is theorized as having the chemical formula $HFeCl_4$. Preferably an amount of hydrochloric acid greater than the stoichiometric amount required to convert ferric chloride to the extractable species is present. For concentrations of ferric chloride in the starting solution in excess of about 50 grams per liter based on the soluble iron present, it has been found that about 15 percent excess of the stoichiometric amount of hydrochloric acid should be present. It is contemplated that for more dilute solutions the stoichiometric desirable may vary from the above.

In case the starting solution does not have the preferred amount of hydrochloric acid present, it is desirable to add hydrochloric acid to the preferred amount. For solutions having about 3 to 4 moles of ferric chloride per liter based on the soluble iron content at least an equivalent amount of hydrochloric acid should be present. The final solution preferably has a normality based on free hydrochloric acid concentration of from about 3 to about 4.5. The hydrochloric acid addition can be monitored by titrating with potassium carbonate solution. A solution containing about 4 moles per liter of ferric chloride based on the iron concentration preferably should have added thereto about 4 moles per liter of concentrated hydrochloric acid.

It has been found that the present invention is particularly effective in extracting ferric chloride from the starting solutions having relatively high concentrations of cobalt or nickel present therein where the amount of cobalt or nickel exceeds about 10 grams per liter with other minor impurities as hereinbefore discussed having a combined concentration of less than about 5 grams per liter.

In accordance with the principles of the present invention, the liquid organic extractant comprises a ketone having less than about 8 carbon atoms. Typical unsubstituted ketones having less than about 8 carbon atoms include diethyl ketone, di-n-propyl ketone, di-isopropyl ketone, methyl ethyl ketone, methyl n-propyl ketone, methyl n-amyl ketone, ethyl n-amyl ketone, methyl isopropyl ketone, methyl n-butyl ketone, methyl isobutyl ketone and mythyl sec-butyl ketone. It has been found that mythyl isobutyl ketone is particularly effective as the active extractant.

The extractant may comprise organic solvents together with the active ketone active extractant. Preferably the major constituent of the extractant is the active ketone extractant with organic solvents being present to a minor extent. It is believed that organic solvents such as kerosene, benzene, petroleum fractions, and other various aromatic solvents commercially available tend to dilute the effectiveness of the active ketone extractant. It is preferred that the extractant consist essentially of the active ketone extractant absent from any organic solvents or other constituents which tend to dilute the effectiveness of the active ketone extractant. As the volume percent of active extractant decreases based on a given total extractant volume, active extractant plus organic solvent, the amount of ferric chloride extractant decreases.

It has been found that the extraction of ferric chloride is improved by the presence of dissolved water in the ketone. Water is generally soluble in the liquid organic extractants hereinbefore mentioned in amounts less than about 3 percent by weight. For ketone extractants not containing dissolved water, it is preferred to contact the ketone with water prior to the extracting step for a sufficient period of time so that water is dissolved in the ketone up to the equilibrium point.

Generally the amount of organic extractant to aqueous chloride solution containing ferric iron can be varied within practical limits. Generally the organic extractant to aqueous solution volume ratio can vary from about 1 to about 5 to about 5 to 1.

Contacting the aqueous chloride solution containing ferric iron with the solvent extractant may be carried out by any of the well-known procedures employed in solvent-extractions. Although continuous counter current methods are preferred, batch, continuous batch, and batch counter current methods are also useful. Any soluble liquid-contacting means may be employed such as a column, a mixing unit equipped with a stirrer and the like.

The organic extractant containing the extracted ferric chloride species is separated from the aqueous solution containing other cations by permitting a phase separation due to the differences in densities between the aqueous and organic liquids. The aqueous solution containing nickel, cobalt and other cation impurities may be further processed to recover the individual constituents.

The separated organic phase comprising the organic extractant and ferric chloride may be stripped of the ferric chloride by contacting with water. The extracted ferric chloride is transferred from the organic extractant to the aqueous phase in the form of ferric chloride and hydrochloric acid. For stripping, it has been found that water at a neutral pH is preferred for effectively stripping the ferric chloride.

Once the ferric chloride is stripped from the organic extractant, the organic may be recycled for contacting with the original aqueous chloride solution containing the ferric iron.

EXAMPLE

The present invention is particularly suited for continuous counter current extraction which is illustrated by the following example. Equipment used consist of an extraction circuit and a stripping circuit. Each circuit consists of three units with each unit having a mixing section and settling section. The mixing section is a container equipped with a magnetic stirer and having an output overflow so that about 50 millimeters are held therein. The output overflow from the mixing section enters a settling portion of about 150 millimeters and includes an overflow output. In both the extraction circuit and stripping circuit, the units are arranged in series so that the aqueous overflow from the settling section of one unit flows into the mixing section of the next unit.

The aqueous feed stream comprises ferric chloride, nickel chloride and cobalt chloride having respective concentrations based on soluble metallic ion of 93.0 grams per liter 12.9 grams per liter and 7.5 grams per liter respectively. Concentrated hydrochloric acid, 12 Normal, is added to the feed solution until free hydrochloric acid concentration reaches 4 Normal. Chlorine gas is bubbled through the feed solution for about 30 minutes. The liquid organic extractant used was a commercially available methyl isobutyl ketone which has been pre-equilibreated with water by mixing with water and using the separated organic phase for the organic extractant feed. The organic extractant is fed into the stripping unit at the rate of about 10 milliliters per minute. The loaded organic extractant exits the extraction circuit and is fed through the stripping circuit at the rate of about 10 milliliters per minute. The feed solution is fed in a countercurrent direction through the extraction section at the rate of about 14 milliliters per minute. The aqueous solution exits the extraction section substantially devoid of soluble ferric iron but containing unextracted nickel and cobalt. This stream is forwarded to another unit to be processed for recovery of the nickel and cobalt components. In the stripping section, the loaded organic feed stream is contacted with water flowing counter current thereto at the rate of about 10 milliliters per minute. The aqueous stream exiting from the stripping section contains iron, nickel, and cobalt having respective concentrations based on the soluble metal of 125 grams per liter, 0.1 grams per liter and 0.1 grams per liter respectively. The above results were obtained during a 14 hour run after steady state operation of the continuous counter current extraction was achieved. Based on the total feed input of the ferric chloride, the above system was effective in recovering about 97 percent of the ferric chloride present in the initial feed solution.

While there has been shown and described what are considered preferred embodiments of the present invention, it will be obvious to those skilled in the art that various changes and modifications may be made therein without departing from the scope of the invention as described in the apended claims.

We claim:

1. A process for removing ferric iron from an aqueous starting solution comprising greater than about 50 grams per liter ferric iron and greater than about 10 grams per liter of other cations selected from the group consisting of cobalt and nickel and mixtures thereof comprising adding hydrochloric acid to said solution until the concentration based on free hydrochloric acid is from about 3 to about 4 normal, oxidizing said solution with chlorine for oxidizing ferrous iron to ferric iron; contacting said solution with an extractant consisting essentially of methyl isobutyl ketone, said methyl isobutyl ketone being pre-equilibriated with water prior to the extraction step, said contacting being for a sufficient period of time to extract ferric iron into said methyl isobutyl ketone, separating the extractant containing ferric iron from the aqueous chloride solution containing other cations, and stripping the ferric iron as ferric chloride with water.

* * * * *